May 29, 1945. G. H. HARRED 2,377,230
CARTON-BLANK HANDLING APPARATUS FOR WIRE-STITCHING MACHINES
Filed Dec. 11, 1942 7 Sheets-Sheet 4

Inventor:
George H. Harred
By
Attorneys.

May 29, 1945. G. H. HARRED 2,377,230
CARTON-BLANK HANDLING APPARATUS FOR WIRE-STITCHING MACHINES
Filed Dec. 11, 1942 7 Sheets-Sheet 6

Inventor:
George H. Harred
By Pennington White
Attorneys.

Patented May 29, 1945

2,377,230

UNITED STATES PATENT OFFICE 2,377,230

CARTON-BLANK HANDLING APPARATUS FOR WIRE-STITCHING MACHINES

George H. Harred, East Greenwich, R. I., assignor to Boston Wire Stitcher Company, Portland, Maine, a corporation of Maine Application December 11, 1942, Serial No. 468,646

15 Claims. (Cl. 1—11)

The present invention relates to an apparatus for separating the top sheet or like object from a stack of sheets or similar articles to facilitate handling or feeding the same, and to the coordinate operation of such apparatus in timed relation to the operation of a machine or device with which it is used.

On object of the present invention is to provide an automatically operated apparatus of the type indicated for displacing the top sheet of a stack with respect to the underlying sheets therein to adapt a single sheet to be grasped for manipulation.

Another object is to provide an apparatus of the type indicated having reciprocating contact-elements or fingers adapted to rest on the top of the stack with means engageable with the edge of the top sheet to slide it rearwardly with respect to the underlying sheets in the stack.

Another object is to provide contact-fingers of the type indicated which are automatically adjustable in accordance with irregularities in the surface of the top sheet.

Another object is to provide contact-fingers of the type indicated which are adapted to tilt to insure their engagement with the edge of the top sheet of the stack.

Another object is to provide an apparatus of the type indicated having an elevator for supporting the stack of sheets and automatically lifting the stack progressively to maintain the top sheet at a predetermined level where it may be engaged by the contact-fingers.

Another object is to provide an apparatus of the type indicated which is adapted to be operated automatically in timed relation to the machine with which it is used to separate one sheet for each cycle of operation of the machine.

A particular object of the invention is to provide an apparatus of the type indicated for separating carton-blanks to adapt them to be folded and fed to a wire-stitching machine.

Another object is to provide an apparatus of the type indicated which is operated by the wire-stitching machine to separate one carton-blank during each cycle of operation of the wire-stitching mechanism regardless of the number of stitches applied.

Still another object is to provide a sheet-separating apparatus of the type indicated which is positive in operation to separate the top carton from the underlying ones in the stack and adapted for cooperation with different types of elevators and wire-stitching machines commonly used to support and stitch carton-blanks.

Further objects of the invention are set forth in the following specification which describes several forms of construction of the apparatus, by way of example, as illustrated by the accompanying drawings. In the drawings.

In stitching or similarly processing carton-blanks of corrugated paper-board, fiber-board or the like, it is the usual practice to stack a large number of blanks, one over another, on an elevator located adjacent the wire-stitching or other processing machine. The operator stands at the rear of the stack and separates the top sheet from the other sheets in the stack to feed it to the processing machine. When the sheets are in the form of flat carton-blanks to be stitched, the operator must fold the sides over the body portion of the blank and feed the folded blank into the wire-stitching machine. The wire-stitching machine then operates automatically to intermittently feed the folded carton-blank forward and apply stitches to fasten together the overlapping edges of the sides. The operator continues to separate, fold and feed the carton-blanks and the elevator operates to gradually raise the stack whereby to continually maintain the top carton-blank at a predetermined level where it is most convenient to handle.

Due to the usual order and arrangement of the carton-blanks in the stack, it is sometimes difficult to separate the topmost carton-blank from the underlying ones in the stack. Such difficulty in separating the top carton-blank from the stack involves loss of time and interrupts the rhythm of the operator's motions, especially when new and unskilled operators are employed. Skilled operators acquire a knack in separating carton-blanks of usual shapes and sizes, but even skilled operators have difficulty in separating carton-blanks of unusual shapes and sizes.

*General organization*

The present invention provides a sheet-separating apparatus which cooperates with the elevator and operates automatically in timed relation to the machine with which it is used for continuously separating the top sheet from the underlying sheets in the stack whereof to facilitate their handling and increase production. In the particular apparatus illustrated in the present drawings, the sheet-separating unit is adapted to operate in conjunction with a wire-stitching unit for stitching the seams of carton-blanks. The sheet-separating mechanism comprises, in general, a pair of spaced fingers adapted to rest on the top surface of the stack. Each finger has a depending shoulder or abutment which engages across the edge of the top carton-blank of the stack and is of less depth than the thickness of the blank. The fingers are mounted for lateral rocking movement to adapt them to adjust themselves to irregularities in the top surface of the stack and are also capable of longitudinal tilting movement to insure proper engagement of their depending shoulders with the edge of the top carton-blank. Upon reciprocation of the fingers through an operative stroke the shoulders will engage the edge of the top carton-blank and slide it rearwardly relative to the stack, or toward the operator, to cause its rearward portion to overhang the rearward side of the stack in position to be easily and quickly grasped by the operator. As each carton-blank is separated from the stack and fed to the wire-stitching machine by the operator the elevator operates automatically to raise the stack and maintain the top carton-blank at a level where the shoulders on the fingers will engage its edge.

The sheet-separating fingers are carried on a pivoted frame which is rocked by gravity to cause the fingers to engage the upper surface of the top carton-blank. The frame is reciprocated by operating means driven from the wire-stitching machine to move the fingers simultaneously through an operative stroke and the arrangement of the operating means is such as to cause the fingers to be reciprocated once only for each cycle of operation of the wire-stitching mechanism, regardless of the number of stitches applied.

In a preferred form of construction the operating means for the sheet-separating fingers is driven directly from the shaft which operates the wire-stitching machine and comprises a latch which is actuated automatically at the completion of an operative stroke of the fingers to release the frame. Springs or equivalent means connected to the frame then operate to slide the latter in the opposite direction to move the fingers through a return stroke. A second latch is actuated automatically to engage the operating means at the end of the operative stroke of the fingers to retain it inoperative until a cycle of operation of the wire-stitching machine has been completed. Upon completion of the cycle of operation of the wire-stitching machine, stopping means for the latter operate through a suitable latch-trip mechanism to release the operating means to permit it to be returned to initial position by a spring. Upon return of the operating means to initial position the first-mentioned latch is again engaged to couple the operating means to the frame carrying the fingers for subsequent operation at the beginning of another cycle of operation of the wire-stitching machine.

In accordance with the modified forms of operating means illustrated in the drawings the frame carrying the fingers may be actuated through an operative stroke by the rocking movement of the feed-rolls of the wire-stitching machine to grip the work or by an electromagnet energized by the work-operated gauge. In another modified form of construction the frame carrying the fingers is operated by the movement of a folded carton-blank toward the wire-stitching mechanism.

Wire-stitching machine

The wire-stitching unit is in the form of a self-contained machine which is substantially identical with that illustrated and described in my United States Letters Patent No. 2,305,419, issued December 15, 1942. Suffice it to state herein that the wire-stitching unit illustrated in Figs. 1 to 3 comprises a pedestal 1 having a platform 2 at its upper end on which a table 3 is supported. Bolted to or otherwise supported at one end of the platform 2 is a hollow casing which extends upwardly and laterally to provide a horizontal arm 4 overlying the table 3. A wire-stitching head 5 is mounted at the outer end of the horizontally-extending arm 4 for operation by a drive-shaft 6 extending through the arm and projecting outwardly beyond its opposite end. The wire-stitching head 5 may be of any suitable construction and, as herein illustrated, is of a type shown and described in United States Letters Patent No. 1,760,031, issued May 27, 1930, to H. G. Allen. In the operation of this type of wire-stitching machine, during the first half-revolution of the drive-shaft 6 a length of wire is cut from a supply, bent into a U-shaped staple, driven into the work and clinched on the under side thereof; and during the second half-revolution of the drive-shaft 6 the parts of the stitching mechanism are returned to initial position and another length of wire is fed into the head. A fly-wheel 7 is mounted for rotation on the projecting end of the drive-shaft 6 and arranged to be continuously driven by a belt 8 from a suitable prime mover, herein illustrated as an electric motor 9. A clutch 10 is provided adjacent the fly-wheel 7, see Fig. 2, for connecting the latter to the drive-shaft 6 for the wire-stitching head 5. Depending from the stitching head 5 is a combined flap-guide and clinching anvil 11 of usual construction.

The work, usually in the form of a carton-blank W, is fed by upper and lower sets of cooperating feed-rolls 15 and 16 which are driven continuously to feed the work to the wire-stitching head 5 and then to intermittently step-feed the work between stitches. The upper pair of feed-rolls 15 are mounted fast on a shaft 17 journaled in suitable bearings depending from the head 5 and the lower pair of feed-rolls 16 are mounted on a suitable shaft 18 carried by a rockable cradle 19, see Figs. 1 and 2. Connected to the shaft 17 is a shaft 20 having a friction-disk clutch 21 thereon. The shaft 20 is connected to a shaft 22 by means of a coupling rod 23 having universal joints at its ends. The shaft 18 is connected to a shaft 24 by means of a similar coupling rod 25, also having universal joints between the shafts. The two shafts 22 and 24 are connected by intermeshing gears 26 and 27 and the end of the shaft 24 is adapted to be connected to the end of a shaft 28 by means of a clutch 29.

The shaft 20 normally is driven from the prime-mover or motor 9 by suitable connections, shown in Patent No. 2,305,419, including a chain 30 for driving a sprocket-wheel formed as a part of the disk-clutch 21, the latter being held in driving engagement by means of a spring 31. By disengaging the clutch 21 and engaging the clutch 29 the continuous high-speed drive for the shaft 20 is disconnected and the latter is driven from the shaft 28. The shaft 28 is rotated intermittently in timed relation to the operation of the wire-stitching mechanism by an eccentric on the shaft 6 operating through a pitman 32 and a one-way clutch 33. The clutches 21 and 29 are operated simultaneously by an electromagnet 34, see Fig. 2, acting through a link 35, lever 36, link 37 and bell-crank shifting fork 38 to disengage the clutch 21 and then, through the connecting rod 39 and shifting fork 40, to engage the clutch 29. Thus, the shafts 17 and 18 and opposed pairs of feed-rolls 15 and 16 normally are continuously driven at high speed to feed the work into the stitching head and upon energization of the electromagnet 34 the clutch 21 disconnects the high-speed driving connections from the prime-mover and connects the intermittently operating driving means thereto. The opposed pairs of feed-rolls 15 and 16 then are driven intermittently in timed relation to the operation of the wire-stitching head 5 to properly space the stitches along the seam of the carton.

The initiation of a cycle of operation of the wire-stitching mechanism in the head 5 is controlled by the movement of the carton-blank W as it is advanced by the feed-rolls 15 and 16 and engages the depending abutment 44 of a gauge 45. The gauge 45 is indentical with that described and illustrated in U. S. Patent No. 2,305,-419, referred to above, being mounted for sliding movement by the engagement of the work therewith, and an abutment or set-screw 46, see Fig. 1a, carried thereon being arranged to close a switch 47. The switch 47 is connected in circuit with the electromagnet 34 which, upon energization, will act to operate the clutches 21 and 29 to disconnect the high-speed continuous drive from the feed-rolls 15 and 16 and connect the intermittently-operating low-speed drive thereto. The carton-blank W will continue its forward movement due to momentum and a second abutment 46', also carried on the gauge 45, will then operate a second switch 47', see Fig. 1a, which is connected in circuit with an electromagnet 48, see also Fig. 1. The electromagnet 48 is connected through a suitable linkage to a clutch-operator 49 for actuating the clutch 10 to connect the fly-wheel 7 to the drive-shaft 6 for the wire-stitching head 5. The wire-stitching mechanism in the head 5 then will be operated to apply stitches to the carton-blank while the shaft 28 is driven intermittently from the shaft 6 through the pitman 32 and one-way clutch 33 to step-feed the work between stitches.

Figures 1, 1A:
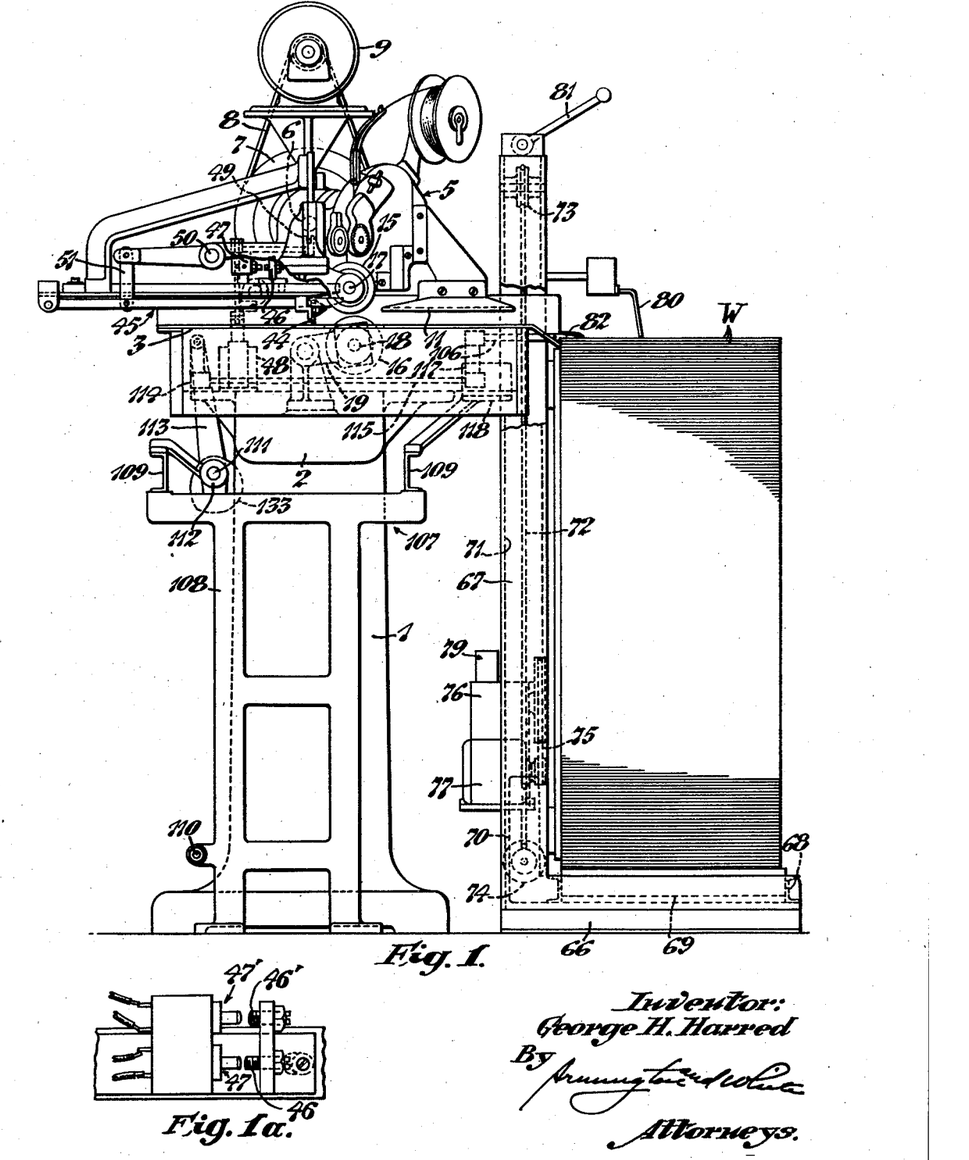
Fig. 1 is an end elevational view of a machine for stitching carton-blanks showing the carton-separating apparatus of the present invention applied to use therewith.
Fig. 1a is a partial plan view of the two electrical switches adapted to be operated by the gauge of the wire-stitching machine.

Upon operation of the wire-stitching head 5 a rock-shaft 50 is turned, see Fig. 1, to operate through a link 51 to lift the abutment 44 of the gauge 45 out of the path of movement of the carton-blank W and perform the several other functions of rocking the cradle 19 carrying the lower feed-rolls 16 to firmly grip the work, apply a brake to the shaft 17 mounting the upper pair of feed-rolls 15 and hold the switch 47 closed whereby to permit release of the gauge 45, these operations being explained in detail in my prior patent referred to above.

Figures 2, 2A:
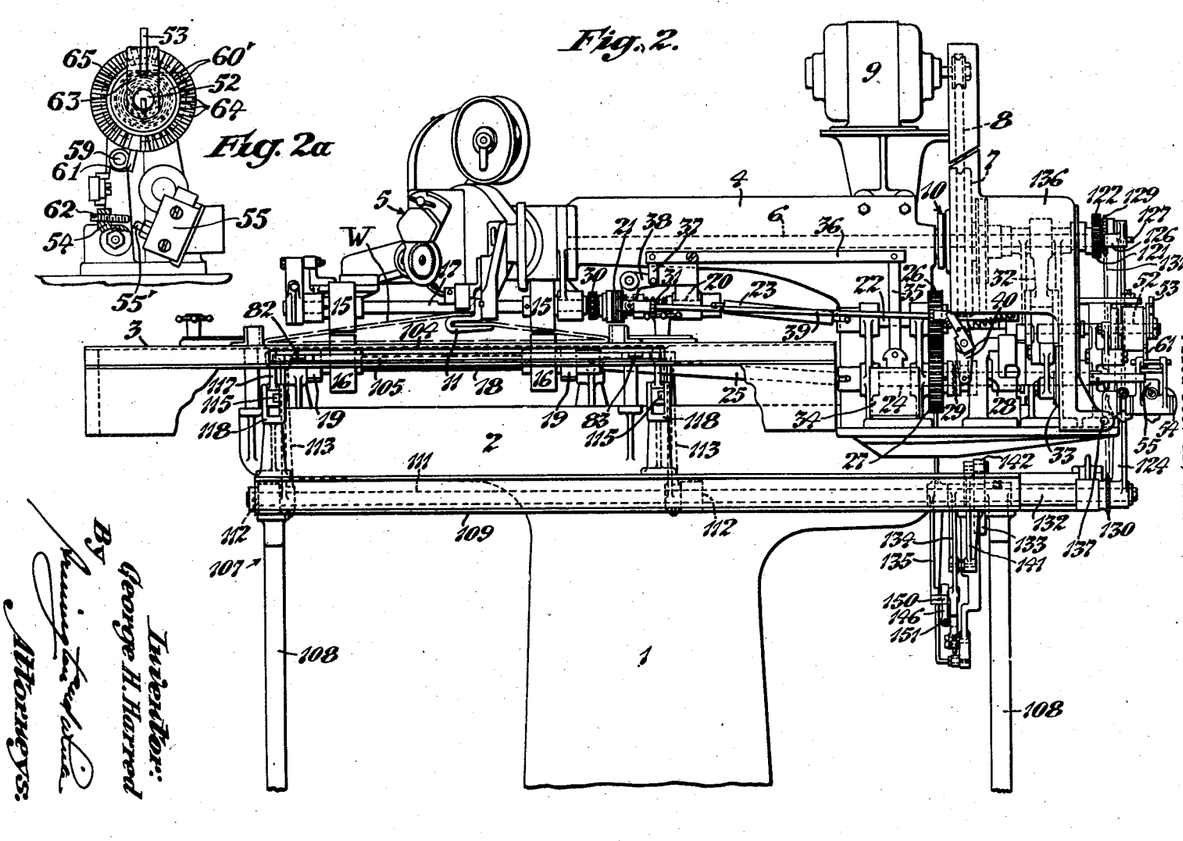
Fig. 2 is a side elevational view of the wire-stitching machine illustrated in Fig. 1.
Fig. 2a is an enlarged end-elevational view showing the manually-adjustable control means for arresting the stitching operation after a predetermined number of stitches have been applied to the work.

A control-shaft 52 is adapted to be turned with a step-by-step movement by the reciprocating pitman 32 and a radial arm 53 at the outer end of the control-shaft is arranged to engage and rock a pivoted frame 54 to close a switch 55. As shown in Fig. 2a, the pivoted frame 54 carries a rod or pin 59 which is adapted to be engaged by the arm 53 and the frame also mounts an abutment or set-screw 62 for engaging the end of a push-button or plunger 55' and sliding it to close the switch 55. The switch 55 is arranged in circuit with an electromagnet 56, see Fig. 3. The plunger-armature of the electromagnet 56 is connected to one end of a bell-crank lever 57 by a link 58 and the opposite arm of the bell-crank is engageable with an adjustable abutment on a pivoted stopping member 60 for arresting the stitching operation. Upon operation of the stopping member 60 the control-shaft 52 is released and returned automatically to its initial position by means of a coiled clock-spring 60' indicated by dotted lines in Fig. 2a. Adjacent the end of the return movement of the control-shaft 52 a second arm 61 at the end thereof engages with the pin 59 and rocks the pivoted frame 54 to release the switch 55 and deenergize the electromagnet 56. The arm 61 is arranged in fixed position on the control-shaft 52 but the arm 53 is adapted for angular adjustment with respect to the fixed arm to adapt it to arrest the stitching operation after any predetermined number of stitches have been applied. Referring to Fig. 2a, the arm 53 is pivotally mounted at the outer end of a member 63 which is rotatable on the end of the control-shaft 52. The arm 53 is adapted to be engaged in any one of a series of radial slots 64 in the face of a disk or dial 65 fixedly secured to the control-shaft 52. The dial 65 is indexed after each stitch is applied to the work, its angular increment of movement being equal to the angular distance between the slots 64 in the dial. It will be understood, therefore, that by inserting the arm 53 in the appropriate slot 64 in the dial 65 the arm will be caused to engage the pin 59 to rock the frame 54 and close the switch 55 after a predetermined number of stitches have been applied to the work. While a particular wire-stitching machine is herein illustrated and described, it will be understood that other types of stitching or stapling devices or similar sheet-processing units may be substituted.

*Elevator*

Figure 17:
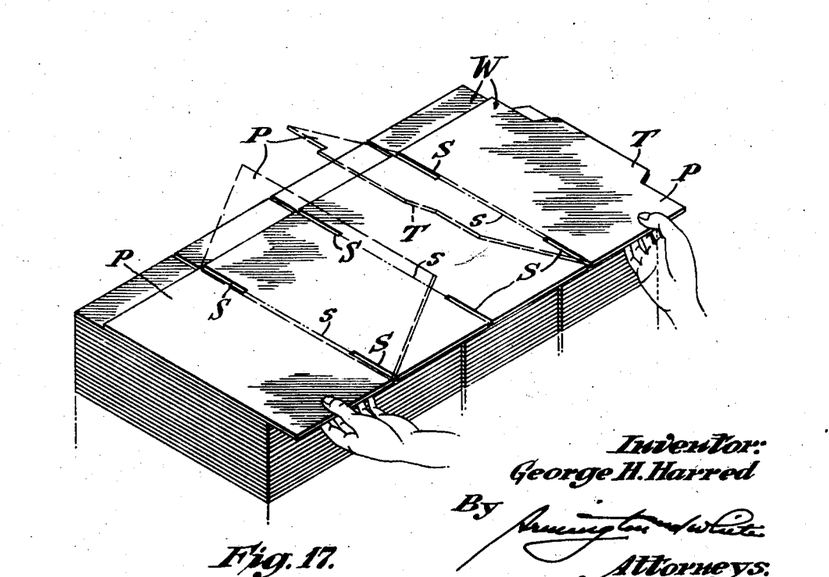
Fig. 17 is a perspective view of the stack of carton-blanks showing the topmost carton-blank displaced rearwardly to facilitate its handling by the operator and illustrating the manner in which the sides of the blank are folded.

The elevator unit used in conjunction with the processing unit is of conventional form commonly used for supporting a stack of sheets in the manner indicated in Figs. 1 and 17 and adapted to operate automatically to raise the stack progressively to position the top sheet at a predetermined level convenient for handling or manipulation.

When the elevator is used in conjunction with a wire-stitching unit the sheets may be in the form of carton-blanks W such as illustrated in Fig. 17. Each carton-blank W has slots S in its marginal portions, see Fig. 17, with scores s extending between the slots to facilitate folding the carton-blank to form separate panels P constituting the sides of the carton to be formed. One end of each carton-blank W has a tab T which is adapted to overlie the edge of the opposite side or panel P to provide an overlapping seam when the blank is folded in the manner indicated by dash-lines in Fig. 17.

The elevator may be of usual construction comprising a base 66 having upright standards 67 at its sides which straddle the table 3 of the wire-stitching machine. A platform 68 mounted on the base 66 is in the form of an open rectangular frame mounting a series of rollers 69. The platform 68 has a bracket 70 at each side which are slidable in guideways 71 in the standards 67. The platform 68 is raised and lowered with respect to the base 66 by means of a pair of cables 72 attached at one end to the brackets 70 and extending upwardly over pulleys 73 at the upper ends of the standards 67. The cables 72 may be operated in any suitable manner to raise the platform 68 gradually with the stack of carton-blanks W supported thereon. With the type of elevator illustrated in the present drawings the cables 72 are operated by a hydraulic motor 74 mounted on the base 66. Motive fluid is supplied by a pump 76 driven by an electric motor 77 through a belt 75 and the delivery of the fluid to the hydraulic motor 74 is controlled by a valve indicated by the reference character 79 in Fig. 1. When the valve 79 is opened the hydraulic motor 74 will be operated to draw on the cables 72 and lift the platform 68. When the valve 79 is closed, the pressure of the motive fluid causes it to open a by-pass valve so that the fluid is merely circulated by the pump 76.

The control-valve 79 may be operated by any suitable feeler means 80 arranged to rest on the top carton-blank W of the stack. The feeler means 80 operates when the topmost carton-blank W is below a predetermined level to open the valve 79 and thereby supply motive fluid to the hydraulic motor 74 to cause it to lift the platform 68 and to stop the motor when the top carton-blank is raised to the proper level. The feeler 80 may be arranged to control the valve 79 of the hydraulic motor 74 mechanically or it may close a switch in an electric circuit and operate the valve 79 electromagnetically in a manner well understood by those skilled in the art. The platform 68 may be lowered manually by turning the handle 81, see Fig. 1, which operates to release the motive fluid trapped in the hydraulic motor 74.

*Sheet-separating unit*

Figure 9:
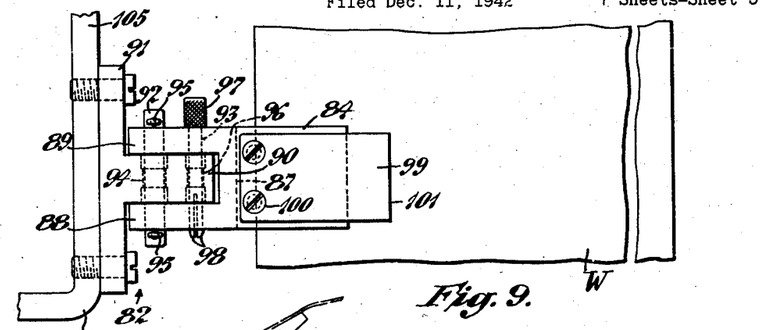
Fig. 9 is a plan view of one of the sheet-separating fingers showing the means for mounting the finger for lateral rocking and longitudinal tilting movement to adapt it to adjust itself to irregularities in the surface of the topmost carton-blank of the stack.
Figure 10:
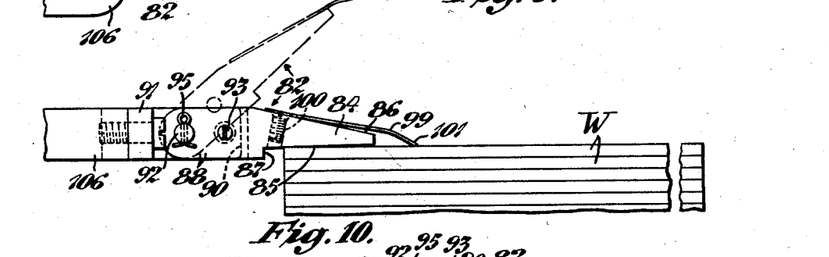
Fig. 10 is a side view of the finger illustrated in Fig. 9 showing it as resting on the upper surface of the topmost carton-blank of the stack and tilted to insure engagement of its shoulder with the edge of the blank.

In accordance with the present invention the sheet-separating unit is provided for sliding the topmost carton-blank rearwardly with respect to the underlying blanks in the stack to adapt it to be grasped readily by the operator. The sheet-separating unit is self-contained and adapted to be mounted between the wire-stitching machine and the elevator. In a preferred form of construction the sheet-separating unit comprises a pair of laterally-spaced fingers 82 and 83 which normally rest on the top surface of the stack of carton-blanks W and are adapted to be reciprocated to slide the top carton-blank rearwardly with respect thereto. As shown in Figs. 9 and 10, each finger 82 or 83 comprises a nose-portion 84 having a flat bottom face 85 and an inclined upper face 86. Adjacent the rearward end of its nose-portion 84 each finger 82 or 83 has a downwardly projecting shoulder 87 of a depth slightly less than the thickness of a carton-blank W. At the rear of the shoulder 87 each finger 82 or 83 is bifurcated to provide spaced arms 88 and 89 for mounting it on the forwardly-projecting tongue 90 of a bracket 91.

Figure 12:
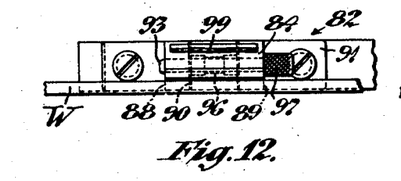
Fig. 12 is a part-sectional end view of the finger showing it as resting on the horizontal upper surface of the stack.

Each finger 82 or 83 is mounted on its tongue 90 for rocking movement in all directions by means of pins 92 and 93. The pin 92 extends through the arms 88 and 89 and through a hole 94 in the tongue 90, the hole being of greater diameter than the shank of the pin and counterbored at its opposite ends, see Fig. 9. The pin 92 therefore has a loose fit in the hole 94 to permit lateral rocking movement of the finger 82 or 83 with respect to the tongue 90 on which it is mounted. The pin 92 is held against axial displacement by means of cotter-pins 95 extending through its ends. The pin 93 is similar to the pin 92 in that it extends through the arms 88 and 89 and a hole 96 in the tongue 90 and has a loose fit in the hole. The pin 93, however, is removable and is provided with a knurled knob 97 at one end and spring-fingers 98 at its opposite end for retaining it in place. It will be observed by reference to Fig. 9 that the loose fit of the pins 92 and 93 in the holes 94 and 96 in the tongues 90 will permit the fingers 82 and 83 to rock in all directions to adapt their bottom faces 85 to adjust themselves to the inclination of, or other irregularities in, the upper surface of a carton-blank with which they engage, see Figs. 12 and 13, whereby to insure engagement of their shoulders 87 with the edge of the topmost carton-blank W.

Mounted on the nose-portion 84 of each finger 82 and 83 is a resilient guide-element 99 in the form of a leaf-spring which is fastened thereto by means of screws 100. The resilient element 99 extends forwardly to overlie the inclined upper face 86 of the nose-portion 84 and its forward end 101 is bent downwardly to overhang the end of the finger and engage the top surface of the stack. It will be observed by reference to Fig. 10 that with the construction of the fingers as described, the inclined ends 101 of the resilient elements 99 will engage the upper surface of the top carbon-blank and provide sloping ramps overlying the ends of the fingers to raise the forward edge of the folded carton-blank upwardly and guide it across the fingers as it is fed to the wire-stitching machine. By removing the pins 93 the fingers 82 and 83 may be rocked upwardly manually on the pins 92 to the position indicated by dash-lines in Fig. 10; this lifting of the fingers not being essential, but in some cases making for greater convenience in loading the elevator.

Figures 3, 4, 5:
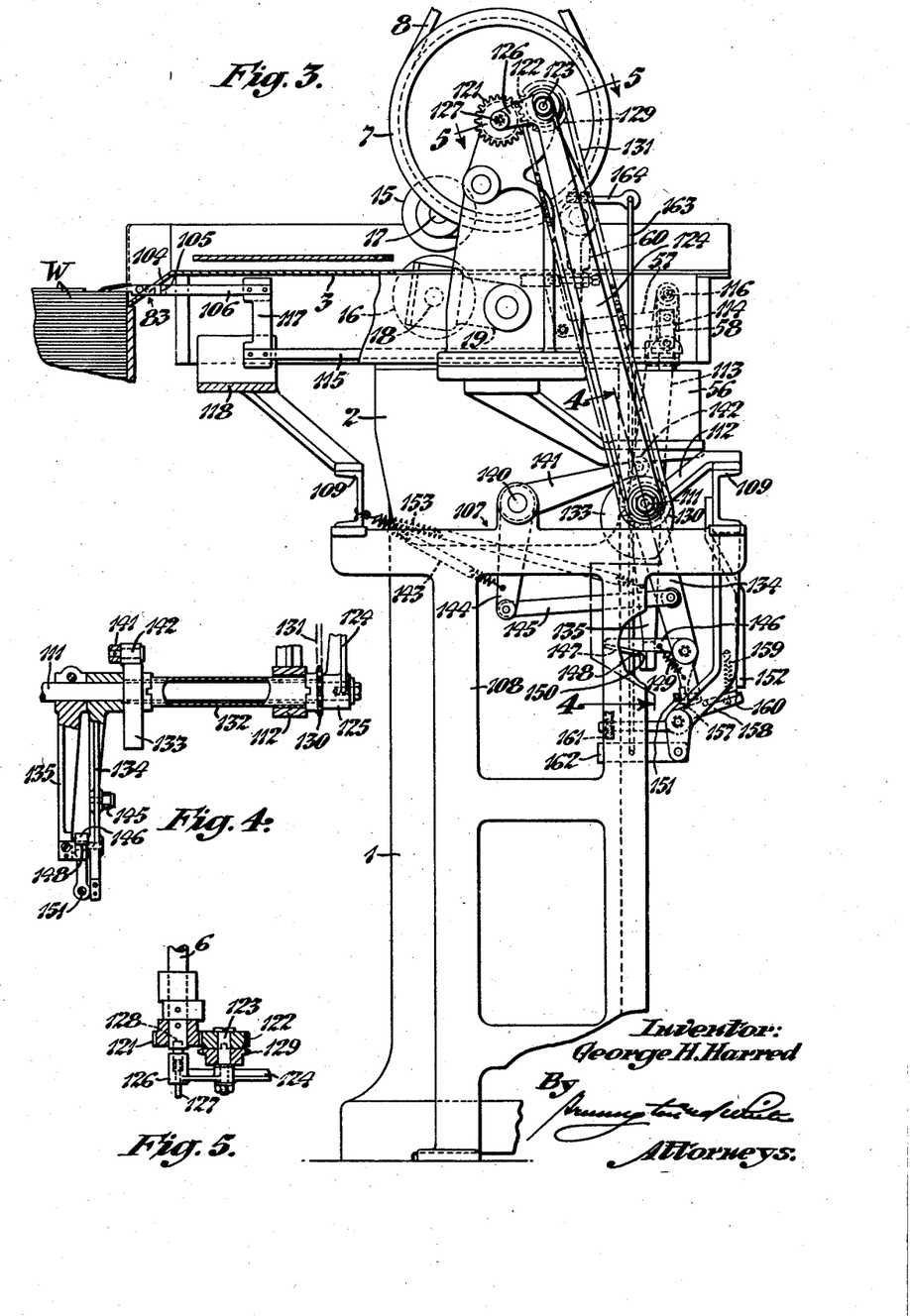
Fig. 3 is an elevational view of the opposite end of the apparatus from that illustrated in Fig. 1 showing the operating means for the fingers of the carton-separating unit as driven from the wire-stitching machine.
Fig. 4 is a transverse sectional view on line 4—4 of Fig. 3 showing certain elements of the operating means for the carton-separating fingers.
Fig. 5 is a sectional view on line 5—5 of Fig. 3 showing the intermeshing gears for driving the operating means for the carton-separating apparatus from the wire-stitching unit.
Figure 11:
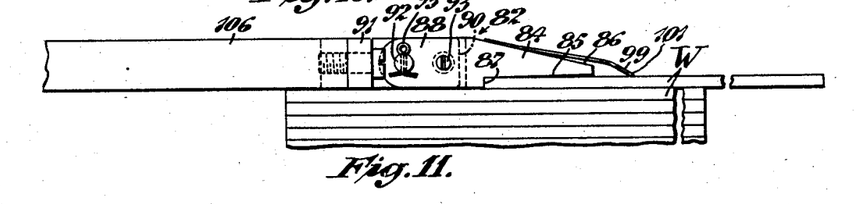
Fig. 11 is a view similar to Fig. 10 showing the finger in position after it has been moved through its operative stroke to slide the top carton-blank rearwardly with respect to the remaining blanks in the stack.

The fingers 82 and 83 are adapted to be reciprocated simultaneously through an operative stroke to slide the topmost carton-blank W of the stack rearwardly or toward the operator from the position illustrated in Fig. 10 to that shown in Fig. 11. For this purpose the brackets 91 mounting the fingers 82 and 83 are attached to the bar 105 of a reciprocable U-shaped frame 106, being fastened thereto by suitable screws. As shown in Figs. 2 and 3, the bar 105 carrying the bracket 91 with the fingers 82 and 83 is movable through a slot 104 in the inclined marginal portion of the table 3. The U-shaped frame 106 may be actuated by any suitable operating means, and in the preferred embodiment of the invention illustrated in Figs. 1 to 8 the operating means is driven mechanically from the wire-stitching unit.

The operating means for the fingers 82 and 83 is mounted on a framework 107 having legs 108 at opposite sides of the stitching machine pedestal 1 and connected by channel-iron rails 109 extending therebetween. The legs 108 are also connected to each other by means of a tie-rod 110, see Fig. 1. A shaft 111 mounted to oscillate in bearings 112 supported on the channel-iron rail 109 carries a pair of upright crank-arms 113 secured fast thereon, see Fig. 1. The ends of the crank-arms 113 are pivotally connected to brackets 114 at one end of horizontally-extending rods 115 by means of pins 116. The opposite ends of the rods 115 are joined to upright brackets 117 similar to the brackets 114 in which the ends of the arms of the U-shaped frame 106 are rigidly connected. The brackets 117 at the ends of the rod 115 are guided in channel-shaped bearings 118 supported on the left-hand channel-iron 109, as viewed in Fig. 3, thus allowing longitudinal sliding movement of the rods and a limited vertical movement thereof while restraining the rods against lateral movement. By rocking the shaft 111 in clockwise direction, as viewed in Fig. 1, motion will be transmitted through the crank-arms 113, brackets 114, rods 115 and brackets 117 to move the channel-shaped frame 106 and fingers 82 and 83 from the position shown in Fig. 10 to that shown in Fig. 11; and by rocking the shaft in counterclockwise direction the frame and fingers will be moved back to the initial position shown in Fig. 10.

In the present embodiment the rock-shaft 111 is arranged to be operated from the main drive-shaft 6 for the wire-stitching head 5. Referring to Figs. 3, 4 and 5, the driving means may comprise a gear 121 on the end of the drive-shaft 6 in mesh with a gear 122 journaled on a stud 123 on a rockable arm 124, see Figs. 3 and 5. The arm 124 has a hub 125 at its lower end mounted on the end of the shaft 111 and is provided with a laterally-extending flange 126 at its upper end mounting a spring-pressed plunger 127. The plunger 127 is adapted to project into a recess 128 in the end of the shaft 6 to hold the gear 122 in mesh with the gear 121, see Fig. 5. Keyed to the gear 122 is a sprocket-wheel 129 connected to a sprocket 130 rotatable on the shaft 111 by means of a chain 131. The sprocket 130 is keyed to a sleeve 132 mounted for rotation on the shaft 111, see Fig. 4, and the sleeve, in turn, is keyed to a cam 133 on the shaft. Mounted free to rock on the shaft 111 is a depending arm 134 and adjacent the hub of the arm is a crank-arm 135 rigidly clamped to the shaft. In accordance with the construction as thus far described, the spring-pressed plunger 127 may be withdrawn manually from the recess 128 in the end of the shaft 6 and the arm 124 rocked on the shaft 111 as a pivot to displace it outwardly beyond a casing 136 which encloses operating mechanism for the feed-rolls, see Fig. 2. The casing 136 is pivoted at 137 to adapt it to be rocked away from the operating mechanism of the feed-rolls to expose the latter for adjustment to control the spacing between stitches.

Mounted on a stud 140 projecting inwardly from the leg 108 of the framework 107 is a bell-crank lever 141 having a follower-roller 142 at the end of one arm engaging the periphery of the cam 133. The follower-roller 142 is held in engagement with the periphery of the cam 133 by means of a spring 143 connected to the arm 144 of the bell-crank and anchored to the channel-iron 109 of the frame. The arm 144 of the bell-crank lever 141 is connected to the arm 134 depending from the shaft 111 by means of a link 145. Rockably mounted on the arm 134 is a latch-member 146 in the form of a bell-crank having an inclined face 147 at the end of one of its arms terminating in a latching shoulder 148. The latch-member 146 is adapted to be rocked in counter-clockwise direction, as viewed in Fig. 3, by means of a spring 149 anchored to the arm 134 to engage its shoulder 148 with a shoulder 150 projecting laterally from the crank-arm 135. The opposite arm of the latch-member 146 carries an adjustable abutment 151 in the form of a set-screw engageable with a fixed abutment 152 depending from the top of the framework 107 to cause it to rock the latch-member and release the crank-arm 135 adjacent the end of the movement of the arm 134 by the cam 133, see Fig. 7. Upon release of the crank-arm 135 a spring 153 connected thereto and anchored to channel-iron 109 will act to rock the crank-arm in clockwise direction. By means of the mechanism desscribed above the initial rotation of the drive-shaft 6 for the stitching head 5 will operate through the intermeshing gears 121 and 122, chain 131, sleeve 132, cam 133, bell-crank 141, link 145, arm 134, latch-member 146 and crank-arm 135 to rock the shaft 111. Thus the shaft 111, acting through the arms 113, rods 115, brackets 117 and frame 106, will reciprocate the fingers 82 and 83 through an operative stroke whereby to slide the top carton-blank W rearwardly with respect to the stack. Upon release of the crank-arm 135 by the latch 146 the spring 153 will rock the shaft 111 in the opposite direction to withdraw the fingers 82 and 83 through a return stroke.

Figures 6, 7:
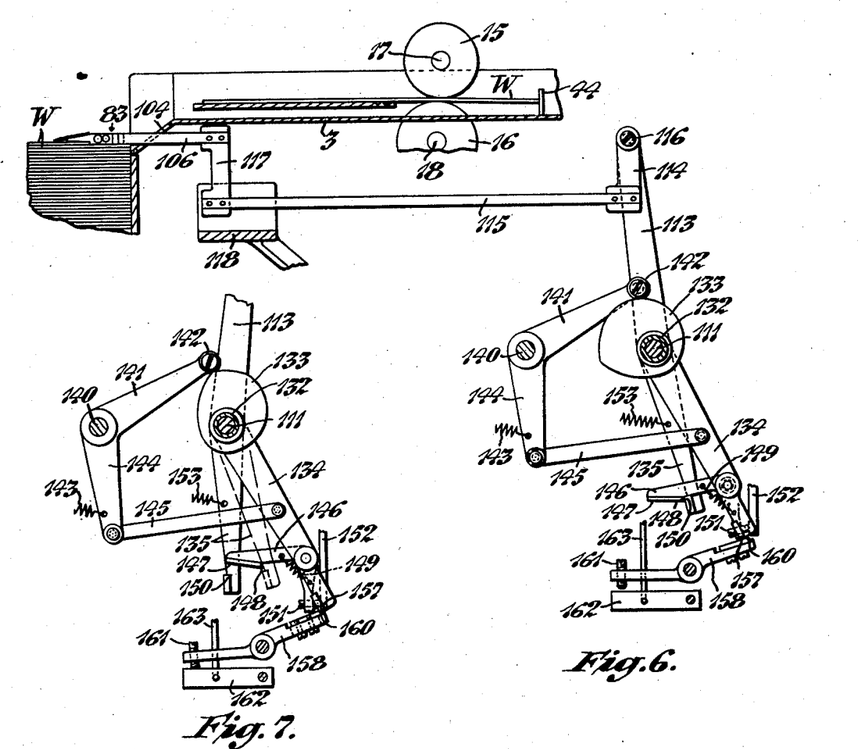
Fig. 6 is a detailed view of the operating means illustrated in Fig. 3 showing the sheet-separating fingers as having been moved through an operative stroke.
Fig. 7 is a view of a portion of the operating means illustrated in Fig. 6 showing the connecting latch as released to uncouple the operating means from the sheet-separating fingers to permit them to move through a return stroke with the operating means shown as latched in inoperative position.
Figure 8:
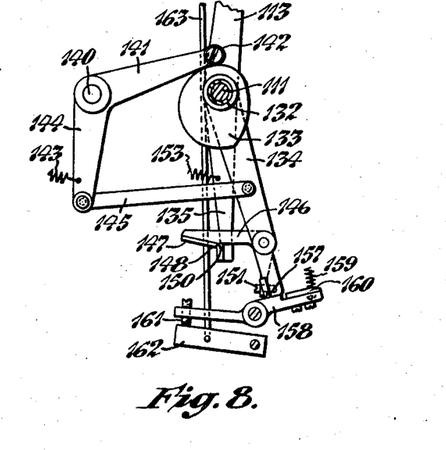
Fig. 8 is a view similar to Fig. 7 showing the latch-trip in position after it is operated at the end of a stitching operation to permit return of the connecting latch to couple the operating means to the sheet-separating fingers.

In accordance with the present invention the fingers 82 and 83 are reciprocated only once for each cycle of operation of the wire-stitching unit regardless of the number of stitches applied. To provide for this control the end of the arm 134 is formed with a laterally-extending latching shoulder 157 adapted to be engaged by a rockable latch-member 158 at the end of its operative stroke, see Figs. 3 and 7. The latch-member 158 is pivoted to a depending portion of the framework 107 and held in raised position by a spring 159 fastened thereto and anchored to the mounting for the latch as shown in Fig. 3. By this means a shoulder 160 on the latch-member 158 is caused to engage the shoulder 157 on the arm 134 as shown in Fig. 7. The cam 133 then will continue to rotate once for each rotation of the drive-shaft 6 but its rotation will have no effect on the operating means for the fingers 82 and 83 as the arm 134 is held latched at the outer limit of its movement as effected by the cam, that is, in inoperative position.

The opposite end of the rockable latch-member 158 has an adjustable abutment 161 in the form of a set-screw which is engageable with a pivoted latch-trip member 162, see Fig. 7. The latch-trip member 162 is operated by a rod 163 having one end connected thereto and its opposite end connected to an arm 164 fixedly attached to the rockable stopping member 60 for the wire-stitching unit, see Fig. 3. Upon completion of a wire-stitching operation the arm 164 is rocked counterclockwise and acting through the rod 163 it will rock the latch-trip member 162 upwardly to the position shown in Fig. 8 to cause it to rock the latch-member 158 and release the arm 134. The arm 134 then will be returned to its initial position under the action of the spring 143 on the bell-crank 141 to cause the latch-member 146 to engage the shoulder 150 on the crank-arm 135. Thus, the operating means for the fingers 82 and 83 is operated once at the beginning of a stitching operation and then is held latched in inoperative position until completion of the stitching operation, at which time it is reset for operation at the beginning of the next stitching operation. A preferred form of apparatus having now been described in detail its mode of operation is as next explained.

Mode of operation

The apparatus is prepared for operation by assembling the flat carton-blanks W one over another on the elevator platform 68 to form a stack as illustrated in Figs. 1 and 17. To facilitate the stacking of the carton-blanks W the pins 93 for mounting the fingers 82 and 83 may be withdrawn and the fingers swung upwardly on the pins 92 away from the stack to the position indicated by dash-lines in Fig. 10. After the carton-blanks W have been stacked to the proper height on the platform 68 of the elevator, the fingers 82 and 83 are swung back to the position shown in Fig. 9 and the pins 93 replaced by sliding them through the arms 88 and 89 in the fingers and the holes 96 in the tongues 90. The fingers 82 and 83 will then seat on the top of the stack as shown in Fig. 10 with the frame 106, rods 115 and brackets 114 pivoting as a unit on the pins 116 at the upper ends of the crank-arms 113 on the shaft 111, see Figs. 1 and 6.

Figure 13:
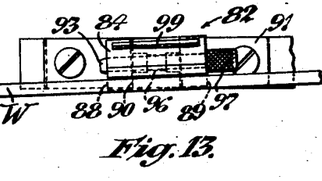
Fig. 13 is a view similar to Fig. 12 showing the finger as rocked laterally to adjusted itself to the upper surface of the stack when the topmost carton-blank assumes an inclined position.

As the nose-portion 84 of the fingers 82 and 83 engage with the upper surface of the top carton-blank W the fingers will be free to tilt longitudinally in the manner illustrated in Fig. 10 to insure engagement of their shoulders 87 with the edge of the topmost carton-blank, the loose engagement of the pins 92 and 93 providing for such tilting movement. The relatively loose fit of the pins 92 and 93 in the holes 94 and 96 in the tongue 90 also permits lateral rocking movement of the fingers as indicated in Fig. 13 to adapt them to seat on the upper surface of the stack when the latter is inclined or curved due to warping of the carton-blanks. Thus, the fingers are adapted to rest on the upper surface of the stack with their shoulders 87 invariably in proper position to engage the edge of the topmost carton-blank W. The resilient elements 99 which overlie and project from the forward ends of the fingers 82 and 83 constitute inclined ramps for guiding the folded carton-blanks W upwardly and across the fingers as they are fed forwardly toward the wire-stitching unit. The feeler 80 is applied to the upper surface of the stack of blanks W on the elevator, see Fig. 1, and the control handle 81 then is manually rocked to render the hydraulic pump 76 and motor 74 operative to raise the stack under control of the feeler to maintain the top carton-blank at a predetermined level.

The wire-stitching unit is rendered operative by closing the circuit for the electric motor 9 which operates through the belt 8 to drive the fly-wheel 7. The electric circuits to the electro-magnets 34, 48 and 56 also are rendered operative by closing suitable line-switches and the energization of the electromagnets is thereafter controlled by the switches 47, 47' and 55. The opposite pairs of feed-rolls 15 and 16 will be driven continuously at high speed from the motor 9 operating through the belt 8 and chain 30 and other connections including the clutch 21 to drive the shafts 20 and 17. The shaft 20 operates through the coupling rod 23 to drive the shaft 22 and through the intermeshing gears 26 and 27 drives the shaft 24, coupling rod 25 and shaft 18 mounting the lower pair of rolls 16. The clutch 21 is held in driving engagement by the spring 31 to connect the continuously operating driving means to the shaft 20 and the clutch 29 is held disengaged by the connecting rod 39 and shifting lever 40.

Figure 14:
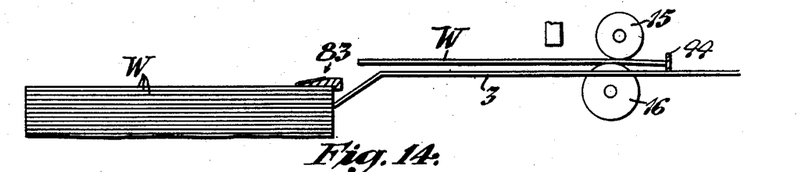
Fig. 14 is a diagrammatic view showing a folded carton-blank being fed toward the gauge of the stitching machine and illustrating one of the fingers in section as resting on the topmost carton-blank of the stack.

The operator starts a stitching operation by withdrawing the top carton-blank W of the stack from under the fingers 82 and 83, folding the side panels P to overlie the body portion of the blank and then feeding the folded blank forwardly into the bite between the upper and lower pairs of feed-rolls 15 and 16, see Fig. 14. The folded carton-blank W then will be automatically fed by the feed-rolls 15 and 16 into engagement with the depending abutment 44 of the gauge 45. The engagement of the forward edge of the folded carton-blank with the depending abutment 44 of the gauge 45 as the blank is carried forward by the feed-rolls 15 and 16 will cause the gauge to slide forwardly and engage the abutment 46 with the switch 47, see Fig. 1, to close the circuit including the electromagnet 34.

Upon energization of the electromagnet 34 its plunger will operate through the link 35, lever 36 and link 37 to rock the bell-crank shifting fork 38 to release the clutch 21 so as to disconnect the high speed continuous drive from the shaft 20. The movement of the bell-crank shifting fork 38 will be transmitted through the connecting rod 39 and shifting lever 40 to engage the clutch 29 simultaneously with the disengagement of the clutch 21. Due to the momentum of the folded carton-blank W the gauge 45 will continue to slide forwardly a short distance to cause the second abutment 46' to close the second switch 47' adjacent the switch 47 to energize the electromagnet 48, see Fig. 1. Upon energization of the electromagnet 48 its plunger will actuate the clutch-operator 49 to engage the clutch 10 whereby to connect the fly-wheel 7 to the drive-shaft 6 for the wire-stitching head 5. The wire-stitching head 5 then will operate to apply a stitch to connect the tab T on one end panel P to the overlying edge of the opposite end panel of the carton-blank W, see Figs. 2 and 17.

During the operation of the wire-stitching mechanism to apply the first stitch the eccentric on the drive-shaft 6 will operate the pitman 32 and the one-way clutch 33 connected thereto through an idle stroke. The second half revolution of the drive-shaft 6 returns the parts of the wire-stitching mechanism to initial position and the pitman 32 will actuate the one-way clutch 33 through an operative stroke to rotate the shaft 28. The shaft 28, being connected to the shaft 24 through the clutch 29, will drive through the coupling rod 25 to rotate the shaft 18 mounting the lower pair of feed-rolls 16. The shaft 24 also will drive through the intermeshing gears 26 and 27 to rotate the shaft 22 which, operating through the coupling rod 23 will rotate the shaft 20 and shaft 17 connected thereto to drive the upper pair of feed-rolls 15 mounted thereon. The rotation of the feed-rolls 15 and 16 will advance the work W a predetermined increment of movement corresponding to the required spacing between the stitches. The wire-stitching mechanism and the intermittently driven feed-rolls 15 and 16 thus will operate in timed relationship to stitch the seam of the carton-blank W.

Upon rotation of the drive-shaft 6 for the wire-stitching head 5 to apply the first stitch to the work the gear 121 on the shaft will drive the gear 122 mounted on the arm 124, see Figs. 3 and 5. Rotation of the gear 122 and sprocket-wheel 129 connected thereto will drive the chain 131 and sprocket 130, which is rotatable on the shaft 111. Rotation of the sprocket 130 will rotate the sleeve 132 and the cam 133 keyed thereto. During rotation of the cam 133 the bell-crank 141 will be rocked against the tension of the spring 143 by the engagement of the follower 142 with the periphery of the cam. Rocking movement of the bell-crank 141 will be transmitted through the link 145 to rock the depending arm 134 on the shaft 111 in counterclockwise direction from the position shown in Fig. 3 to that shown in Fig. 6. Due to the engagement of the shoulder 148 of the latch-member 146 on the arm 134 with the shoulder 150 on the crank-arm 135 which depends from the shaft 111, the crank-arm and shaft will be rocked counterclockwise with the arm 134. The rocking motion of the shaft 111 will be transmitted by the crank-arms 113 to the brackets 114 fixed to the ends of the rods 115 to slide the latter rearwardly toward the left as viewed in Fig. 6. The fingers 82 and 83 on the U-shaped frame 106 at the opposite end of the rods 115 thus will be moved through an operative stroke. As the fingers 82 and 83 are moved by the frame 106 their depending shoulders 87 will engage the forward edge of the top carton-blank W of the stack and slide it rearwardly, or toward the operator, from the position shown in Fig. 10 to that shown in Fig. 11. Referring to Fig. 17, the rearward side of the carton-blank W, that is, the side toward the operator, thus will be displaced into overhanging or offset relation to the remainder of the stack where it may be easily and quickly grasped in the fingers.

Figure 15:
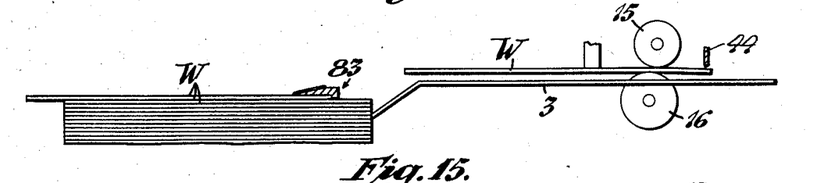
Fig. 15 is a view similar to Fig. 14 showing a carton-blank in position to be stitched with the finger in position after it has been actuated to slide the next carton-blank rearwardly.
Figure 16:
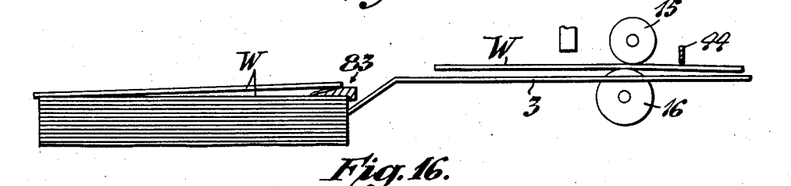
Fig. 16 is a view similar to Fig. 14 showing the finger at the end of its return stroke with its depending shoulder overlying the edge of the next underlying blank and illustrating the top carton-blank as being fed forwardly manually over the top of the finger.

Adjacent the end of the movement of the arm 134 under the action of the cam 133 the adjustable abutment 151 on the latch-member 146 will engage the fixed abutment 152 to rock the latch-member clockwise from the position shown in Fig. 6 to that shown in Fig. 7. This latter movement of the latch-member 146 will act to disengage its shoulder 148 from the shoulder 150 of the crank-arm 135 to release the latter which then will be moved by the spring 153 from the position indicated by dash-lines to that shown in full lines in Fig. 7. The return movement of the crank-arm 135 and shaft 111 thus will be transmitted through the crank-arms 113 and rods 115 to move the frame 106 and fingers 82 and 83 through a return stroke from the position shown in Fig. 15 to that shown in Fig. 16. It will be understood, therefore, that the fingers 82 and 83 are reciprocated through an operative stroke to slide or jog the top carton-blank W rearwardly at the commencement of a stitching operation and then immediately withdrawn through a return stroke to their initial position to rest on the next underlying carton-blank in the stack with their depending shoulders 87 overlying the edge thereof in position for a subsequent operation.

At the end of the movement of the depending arm 134 to the right as viewed in Fig. 7, the latch trip-member 158 will be operated by the spring 159 to engage its shoulder 160 with the shoulder 157 at the end of the arm. The arm 134 and operating bell-crank 141 thus will be held in inoperative position throughout the remainder of the cycle of operation of the wire-stitching mechanism in the head 5. In other words, at this juncture the cam 133 will continue to be operated during the rotation of the drive-shaft 6, but the follower roller 142 will be held away from the periphery of the cam so that the latter will have no effect on the arm 134. Moreover, the latch-member 146 will be held disengaged from the shoulder 150 on the depending crank-arm 135.

During the operation of the wire-stitching mechanism in the head 5 the control-shaft 52 is turned through a predetermined increment of movement for each stitch applied to the work until the radial arm 53 at the end of the shaft comes into engagement with and rocks the pivoted frame 54 to close the switch 55. Closing of the switch 55 will energize the electromagnet 56, see Fig. 3, which, operating through the link 58 and bell-crank 57 will rock the pivoted stopping member 60 to arrest the stitching operation. The arm 164 mounted on the stopping member 60 likewise will be rocked to operate through the rod 163 to rock the latch trip-member 158 from the position shown in Fig. 7 to that shown in Fig. 8 to release the arm 134. Upon release of the arm 134 the spring 143 will rock the arm back to initial position as shown in Fig. 3 to cause the shoulder 148 on the latch-member 146 to engage the shoulder 150 on the crank-arm 135 depending from the shaft 111. The parts of the operating mechanism thus will be returned to initial position after a cycle of operation of the wire-stitching unit. It will be understood that the operating mechanism for the sheet-separating fingers 82 and 83 will be operated only once for each cycle of operation of the wire-stitching mechanism, regardless of the number of stitches applied to the work. When carton-blanks W of different sizes and shapes are to be stitched with different numbers of stitches, the arm 53 on the control shaft 52, see Fig. 2a, may be adjusted with respect to the arm 61 to apply any predetermined number of stitches during a stitching operation before the stopping member 60 is actuated, but regardless of the relative adjustment of the arms the sheet-separating fingers 82 and 83 will be operated only once for each cycle of operation of the wire-stitching mechanism.

The operator may continue to fold and feed the carton-blanks W one after another from the top of the stack as the sheet-separating fingers 82 and 83 are operated once at the beginning of each cycle of operation of the stitching mechanism to displace each uppermost carton-blank rearwardly with respect to the underlying blanks in the stack. It will be understood that the wire-stitching unit will operate to feed, stitch and discharge the carton-blanks W at a rate at least as fast as the operator can grasp, fold and advance the carton-blanks to the feed-rolls 15 and 16. In other words, the operator will not be able to overfeed the stitching unit regardless of how fast he operates. However, by having the top carton-blank W jogged or displaced rearwardly with respect to the underlying blanks in the stack the operator can more easily and quickly grasp the blank in the manner indicated in Fig. 17. Thus, no time is wasted in separating the top carton-blank W from the remaining ones in the stack and there is no interruption of the rhythm of the operator's motions so he may fold and advance the blanks at maximum efficiency. When all the carton-blanks W of the stack have been stitched, the operator may rock the handle 81 for manually controlling the valve 79 of the hydraulic drive for the elevator platform 68 to cause it to be lowered to receive another stack of blanks W to be stitched.

*Modified constructions of finger-operating means*

Figure 18:
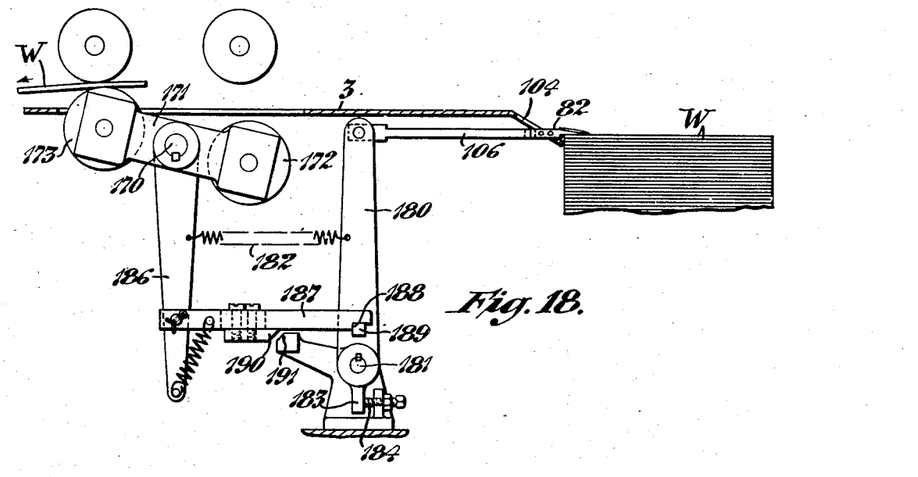
Fig. 18 is a part-sectional side elevational view of a modified form of construction of the operating means for the carton-separating fingers.

Fig. 18 of the drawings illustrates a modified form of operating means for the fingers 82 and 83 which may be adapted for use with a wire-stitching machine or unit of the type illustrated and described in my Patent No. 2,266,550, issued December 16, 1941. This form of wire-stitching machine comprises a rock-shaft 170 having a pair of arms 171 keyed thereto and mounting feed-rolls 172 at one end with discharge rolls 173 at their opposite end. Upon operation of the gauge, shown in the patent referred to above, by the work W the rock-shaft 170 is rocked in counterclockwise direction as viewed in Fig. 18 to engage the feed-rolls 172 with the work to advance it between stitches. Upon completion of a stitching operation the rock-shaft 170 is rocked in clockwise direction to engage the rolls 173 with the stitched carton-blank to discharge it from the wire-stitching machine as explained in detail in my prior patent referred to above.

The sheet-separating fingers 82 and 83 are of a construction identical with that shown in Figs. 1 to 8 of the present drawings, being mounted on the U-shaped frame 106. The ends of the arms of the frame 106, however, are pivotally connected to the ends of spaced upright arms 180 keyed to a shaft 181. Thus, upon rocking movement of the shaft 181 and arms 180 in clockwise direction the sheet-separating fingers 82 and 83 will be moved through an operative stroke to displace the top carton-blank W relatively of the underlying ones in the stack. The shaft 181 and arms 180 are moved through a return stroke by means of a spring 182 and the return movement is limited by the engagement of a lug 183 depending from the hub of one of the arms 180 with an adjustable abutment 184.

The shaft 181 and arms 180 are actuated through an operative stroke by a crank-arm 186 depending from the rock-shaft 170 and carrying a latch-member 187 pivotally mounted thereon. The latch-member 187 has a shoulder 188 which is adapted to engage a projection 189 on one of the arms 180. A cam 190 mounted on the latch-member 187 intermediate its ends is adapted for engagement with a fixed cam 191.

Upon initiation of a wire-stitching operation the rock-shaft 170 will be rocked in counterclockwise direction to engage the feed-rolls 172 with the work which, in turn, will cause the depending crank-arm 186 to be rocked to move the latch-member 187 toward the right as viewed in Fig. 18. Due to the engagement of the latch-shoulder 188 with the projection 189 on one of the upright arms 180 the frame 106 and the fingers 82 and 83 carried thereby will be moved through an operative stroke. Adjacent the end of the movement of the latch-member 187 to the right the cam 190 thereon will engage the fixed cam 191 to raise the latch-member and release its shoulder 188 from engagement with the projection 189. Upon release of the latch-shoulder 188 from its engagement with the projection 189 the arms 180, frame 106 and fingers 82 and 83 will be moved through a return stroke by the spring 182. The parts of the operating mechanism will remain in inoperative position until the stitching operation is completed at which time the rock-shaft 170 will be returned to its initial position shown in Fig. 18. During such return movement of the rock-shaft 170 the latching member 187 will be moved toward the left to cause its shoulder 188 to engage again with the projection 189 on the upright arm 180. The operating mechanism is then ready for another cycle of operation.

Figure 19:
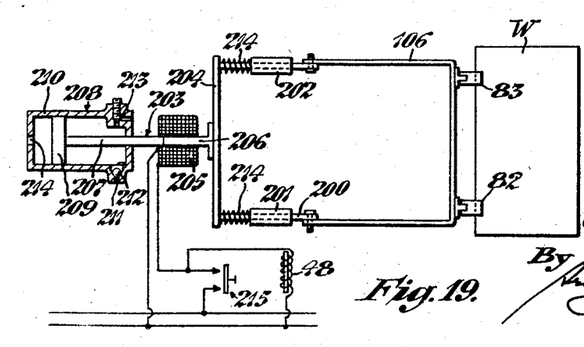
Fig. 19 is a top plan view of another modified form of construction showing electromagnet-operating means for the carton-separating fingers.

Fig. 19 illustrates electromagnet operating means for the carton-separating fingers 82 and 83. In this modified form of construction the ends of the arms of the frame 106 are pivotally connected to the ends of the arms of a U-shaped frame 200 mounted to slide in suitable bearings 201 and 202. An armature 203 extends forwardly from the cross-bar 204 of the frame 200 centrally thereof and through an electromagnet winding 205. The armature 203 has a non-magnetic portion 206 normally positioned within the winding 205 and a magnetic portion 207 extending beyond the winding. At the end of the armature 203 is a dashpot 208 for retarding the movement of the frame 200 under the action of the electromagnet 205. The dashpot 208 comprises a piston 209 attached to the armature 203 and slidable in a stationary cylinder 210. Air may be admitted into the cylinder 210 at one side of the piston 209 through a port 211 controlled by a ball-valve 212, but can escape only through an adjustable throttle-valve 213. The cylinder 210 is vented at the opposite side of the piston 209 by a relatively large port 214. Referring to the diagram in Fig. 19, the electromagnet winding 205 is connected in an electric circuit in parallel with the electromagnet 48 for operating the main clutch 10 of the wire-stitching head 5, see Figs. 1 and 2. The circuit includes a switch 215 operated by the gauge 45 of the wire-stitching machine.

With the form of construction illustrated in Fig. 19, engagement of the forward edge of the folded carton-blank W with the depending abutment 44 of the gauge 45, see Fig. 1, will slide the latter to first engage the abutment 46 with the switch 47 and thereafter with the switch 215 to close the circuit including the electromagnet winding 205, see Fig. 19. Upon energization of the electromagnet winding 205 the magnetic portion 207 of the armature 203 will be attracted to cause it to be moved toward the right as viewed in Fig. 19. Movement of the armature 203 and frames 200 and 106 toward the right will move the fingers 82 and 83 through an operative stroke to displace the top carton-blank W relatively of the underlying blanks in the stack. When the operation of the wire-stitching mechanism is initiated the abutment 44 of the gauge 45 will be lifted by the rocking movement of the shaft 50, as explained in my U. S. Patent No. 2,305,419, referred to above, to release the abutment from engagement with the forward edge of the carton-blank W. Upon release of the abutment 44 the gauge 45 will slide to the right, as viewed in Fig. 1, to release the switch 215 whereby to open the circuit to the electromagnet winding 205. Deenergization of the electromagnet winding 205 will release the armature 203 so that the springs 214 acting between the bearings 201 and 202 and the frame 200 will slide the latter together with the frame 106 to withdraw the fingers 82 and 83 through a return stroke to restore them to initial position.

Figure 20:
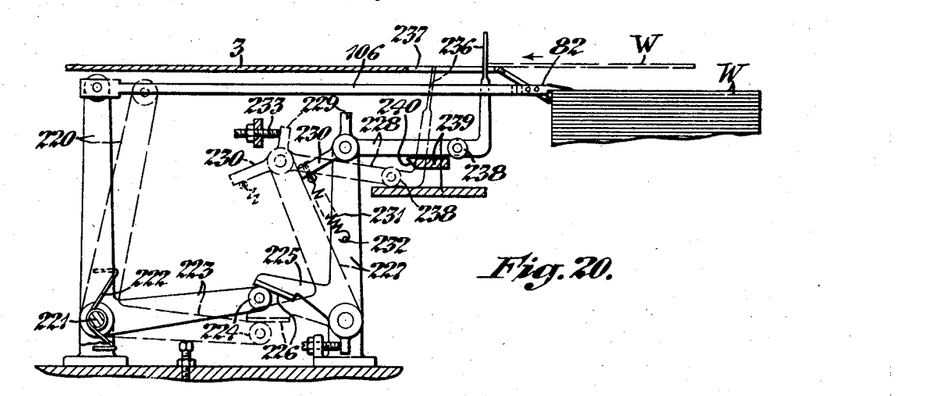
Fig. 20 is a side elevational view of still another modified form of construction of the operating means for the fingers to adapt them to be actuated by the movement of a folded carton-blank toward the stitching mechanism.

Fig. 20 illustrates an operating mechanism for the fingers 82 and 83 adapted to be actuated by the movement of the folded carton-blank W as it is fed toward the wire-stitching mechanism. The fingers 82 and 83 are mounted on the U-shaped frame 106 and the arms of the frame are pivotally connected to the ends of upright arms 220. The arms 220 are fixedly mounted on a shaft 221 for movement in unison and the shaft normally is rocked by springs 222 to the position illustrated in full lines to retain the fingers 82 and 83 in their retracted position. One of the arms 220 is in the form of a bell-crank having a laterally-extending arm 223 with a roller 224 at its end. Adjacent the arm 223 is a bell-crank lever having a laterally-extending arm 225 with a cam-face 226 overlying the roller 224 and an upright arm 227. Mounted to rock on the end of the upright arm 227 is a lever 228 having an upwardly-extending abutment-lug 229 and a downwardly-inclined lug 230. The lever 228 normally is adapted to be rocked in counterclockwise direction by a spring 231 connected to the lug 230 and anchored to a pin 232 extending laterally from the upright arm 227. Adjacent the abutment lug 229 is an adjustable abutment 233. At the rearward end of the lever 228 is a trip-finger 236 which projects upwardly through a slot 237 in the table 3 of the stitching machine and into the path of movement of a folded carton-blank W as it is fed to the wire-stitching mechanism. Mounted on the lever 228 adjacent the trip-fingers 236 is a roller 238 which is adapted to cooperate with a cam-track 239 having a forward beveled face 240.

With the form of construction illustrated in Fig. 20 the operator removes the top carton-blank W from the stack, folds the ends to overlie the body-portion and feeds it toward the wire-stitching mechanism. During the movement of the folded carton-blank toward the wire-stitching mechanism its forward edge will engage the trip-finger 236 and move it, together with the lever 228 and arm 227 of the bell-crank, to rock the latter in counterclockwise direction. Rocking movement of the bell-crank will cause the cam-face 226 on the arm 225 to engage the roller 224 on the arm 223 to rock the arm 220 together with the shaft 221 on which it is mounted from the position shown in full lines to that indicated by dash lines in Fig. 20. Rocking motion of the shaft 221 will be transmitted through the upright arms 220 to slide the U-shaped frame 106 toward the right to displace the top carton-blank relatively of the underlying ones of the stack. During the movement of the lever 228 toward the left the abutment 229 will engage the abutment 233 to cause the lever to rock clockwise to the position indicated by dash-lines whereby to withdraw the trip-finger 236 from the path of movement of the carton-blank. The folded carton-blank W then will pass across the top of the trip-finger which is free to move toward the right to its initial position. Upon release of the trip-finger 236 from engagement with the forward edge of the carton-blank W the spring 222 will rock the upright arms 220 in counter-clockwise direction which, in turn, will rock the arm 223 to cause it to operate through the roller 224 and arm 225 to rock the arm 227 of the bell-crank from the position shown in dash-lines to that shown in full lines in the drawings. During the rocking movement of the bell-crank the movement of the lever 228 will be restricted by the engagement of its roller 238 with the inclined face 240 of a cam-track 239 to cause the lever to be returned to initial position while the trip-finger is held depressed out of the path of movement of the carton. At the end of the return stroke of the lever 228 the upper end of the trip-finger 236 will bear against the under side of the carton-blank W and will be in position to be raised to engage the forward edge of the next carton-blank to be fed toward the wire-stitching mechanism. Thus, the carton-separating fingers 82 and 83 are moved through an operative stroke by the carton-blank itself and then returned to initial position to engage the forward edge of the next underlying carton-blank in the stack.

It will be observed from the foregoing specification that the present invention provides a sheet-separating unit which operates in conjunction with an elevator and processing unit to separate the top sheet from the underlying sheets in the stack to facilitate handling and manipulation thereof by the operator. It also will be observed that the sheet-separating unit of the present invention is adapted for use to displace the topmost carton-blank relatively of the other blanks in a stack and to operate only once for each cycle of operation of the wire-stitching machine with which it is used, regardless of the number of stitches applied. It still further will be observed that the carton-separating mechanism of the present invention is of relatively simple and compact construction and one which is adapted for use over long periods of time without requiring repair or replacement of parts.

While a preferred embodiment of the sheet-separating unit and several modified forms of operating means therefor are herein illustrated and described for use in conjunction with an elevator and sheet-processing unit, it is to be understood that further modifications may be made in the structure and arrangement of the parts of the apparatus without departing from the spirit or scope of the invention. Therefore, without limiting myself in this respect, I claim:

1. An apparatus of the type indicated comprising wire-stitching means, means for supporting a stack of sheets to be stitched, and means operated by and controlled in timed relation to the operation of the wire-stitching means for displacing the top sheet relative to the underlying sheets in the stack by moving it rearwardly of the wire-stitching means to adapt it to be grasped manually and fed to the wire-stitching means.

2. An apparatus of the type indicated comprising wire-stitching means, an elevator adjacent the wire-stitching means for supporting a stack of carton-blanks to be stitched, means for operating the elevator to raise the stack to maintain the top carton-blank at a predetermined level, and means operated in timed relation to the wire-stitching means to engage across the edge of the top carton-blank and displace it relative to the underlying blanks in the stack to adapt it to be grasped manually and fed to the wire-stitching means.

3. An apparatus of the type indicated comprising wire-stitching means, driving means for the wire-stitching means, an elevator adjacent the wire-stitching means for supporting a stack of carton-blanks to be stitched, means for operating the elevator to raise the stack to maintain the top carton-blank at a predetermined level, means for displacing the top carton-blank relative to the underlying blanks in the stack to adapt it to be grasped manually and fed to the wire-stitching means, and means operated by the driving means for the wire-stitching means for operating the carton-displacing means.

4. An apparatus of the type indicated comprising wire-stitching means, an elevator adjacent the wire-stitching means for supporting a stack of carton-blanks to be stitched, means for operating the elevator to raise the stack to maintain the top carton-blank at a predetermined level, means for displacing the top carton-blank relative to the underlying blanks in the stack to adapt it to be grasped and fed to the wire-stitching means, means operated by the carton-blank as it is fed to the wire-stitching means for initiating the operation of the latter, and means operated by the wire-stitching means for actuating the blank-displacing means.

5. An apparatus of the type indicated comprising wire-stitching means, means adjacent the wire-stitching means for supporting a stack of carton-blanks to be stitched, reciprocating means for displacing the top carton-blank relative to the underlying blanks in the stack to adapt it to be grasped manually and fed to the wire-stitching means, means operated by the carton-blank as it is fed to the wire-stitching means for initiating the operation of the latter, and means actuated by the wire-stitching means for operating the reciprocating means.

6. An apparatus of the type indicated comprising a wire-stitching means, means adjacent the wire-stitching means for supporting a stack of carton-blanks to be stitched, reciprocating means for displacing the top carton-blank relative to the underlying blanks in the stack to adapt it to be grasped manually and fed to the wire-stitching means, means operated by the carton-blank as it is fed to the wire-stitching means for initiating the operation of the latter, and means driven from the wire-stitching means for operating the reciprocating means once for each operation of applying a series of stitches regardless of the number of stitches applied during such operation.

7. An apparatus of the type indicated comprising wire-stitching means, means adjacent the wire-stitching means for supporting a stack of carton-blanks to be stitched, reciprocating means for displacing the top carton-blank relative to the underlying blanks in the stack to adapt it to be grasped manually and fed to the wire-stitching means, means operated by the carton-blank as it is fed to the wire-stitching means for initiating the operation of the latter, means driven by the wire-stitching means for operating the reciprocating means, means for latching said operating means in inoperative position, and means controlled by the wire-stitching means for tripping the latching means to release the operating means upon completion of a wire-stitching operation.

8. An apparatus of the type indicated comprising wire-stitching means, means adjacent the wire-stitching means for supporting a stack of carton-blanks to be stitched, reciprocating means for displacing the top carton-blank relative to the underlying blanks in the stack to adapt it to be grasped manually and fed to the wire-stitching means, means actuated by the carton-blank as it is fed to the wire-stitching means for initiating the operation of the latter, means for operating the reciprocating means from the wire-stitching means to displace a carton-blank, means for latching the reciprocating means against operation after each reciprocation and during the application of a series of stitches by the wire-stitching means, and means for arresting the operation of the wire-stitching means after each series of stitches has been applied and tripping the latching means to release the reciprocating means.

9. An apparatus of the type indicated comprising wire-stitching means, means adjacent the wire-stitching means for supporting a stack of carton-blanks to be stitched, reciprocating means for displacing the top carton-blank relative to the underlying blanks in the stack to adapt it to be grasped manually and fed to the wire-stitching means, means actuated by the carton-blank as it is fed to the wire-stitching means for initiating the operation of the latter, means activated by the wire-stitching means for operating the reciprocating means to displace a carton-blank, means for latching the reciprocating means against operation after each reciprocation and during the application of a series of stitches, control means for arresting the stitching operation at the completion of the application of a series of stitches, and means actuated by the control means for tripping the latching means to release the reciprocating means.

10. A device for separating the top sheet from a stack of sheets comprising fingers adapted to rest on the top of the stack and having means for engaging across the edge of the top sheet, means for reciprocating the fingers to engage them with the edge of the top sheet and displace it with respect to the underlying sheets in the stack, and yieldable elements having portions overlying the ends of the fingers and engageable with the surface of an underlying sheet to guide the forward edge of the uppermost sheet above and across the fingers as said sheet is fed forwardly.

11. A device for separating the top sheet of a stack of sheets comprising fingers adapted to rest on the top of the stack and having depending shoulders for engaging the edge of the top sheet, said shoulders being of a depth less than the thickness of the sheet, means for mounting said fingers to permit them to rock in several directions to adapt them to adjust themselves to the surface of the sheet on which they rest, yieldable elements having portions overlying the ends of the fingers for guiding the forward edge of a sheet above and across the ends of the fingers as said sheet is fed forwardly, and means for reciprocating the fingers to displace the top sheet relative to the underlying sheets in the stack.

12. An apparatus of the type indicated comprising wire-stitching means, means for adjusting the wire-stitching means to apply any predetermined number of stitches during a cycle of operation, means adjacent the wire-stitching means for supporting a stack of sheets to be stitched, fingers adapted to rest on the top of the stack and engage the edge of the top sheet thereof, and means comprising a cam operated by the wire-stitching means for reciprocating the fingers in timed relation to each cycle of operation of the wire-stitching means.

13. An apparatus of the type indicated comprising wire-stitching means, means for adjusting the wire-stitching means to apply any predetermined number of stitches to the work during a single cycle of operation, means adjacent the wire-stitching means for supporting a stack of sheets to be stitched, fingers adapted to rest on the top of the stack and engage the edge of the top sheet thereof, a cam driven by the wire-stitching means, means actuated by the cam for reciprocating the fingers, means for latching said operating means in inoperative position, and means operated at the completion of a cycle of operation of the wire-stitching means to release the latching means whereby the fingers are caused to be reciprocated once for each stitching operation.

14. An apparatus of the type indicated comprising wire-stitching means, control means for adjusting the wire-stitching means to apply a predetermined number of stitches during a cycle of operation, stopping means operated by the control means for arresting the operation of the wire-stitching means, an elevator adjacent the wire-stitching means for supporting a stack of sheets to be stitched, means for operating the elevator to raise the stack to maintain the top sheet at a predetermined level, fingers adapted to rest on the top of the stack and engage the edge of the top sheet, a cam driven by the wire-stitching means, means operated by the cam to reciprocate the fingers, means for automatically latching said operating means in inoperative position, and means operated by the stopping means for the wire-stitching means to release the latching means whereby one sheet is caused to be displaced relative to the underlying sheets in the stack during each cycle of operation of the wire-stitching means regardless of the number of stitches applied.

15. An apparatus of the type indicated comprising wire-stitching means, means for supporting a stack of carton-blanks to be stitched, fingers adapted to rest on the top of the stack and engage the edge of the top carton-blank thereof, a frame connecting the fingers for simultaneous movement, and means comprising a trip-finger arranged in the path of movement of a carton-blank as it is fed to the wire-stitching means and connected to reciprocate the frame to cause the fingers to displace the top carton-blank relative to the underlying blanks in the stack.

GEORGE H. HARRED.